INVENTORS
REED A. PALMER
DONALD C. PRIDHAM, JR.
BY ROLAND D. BECK

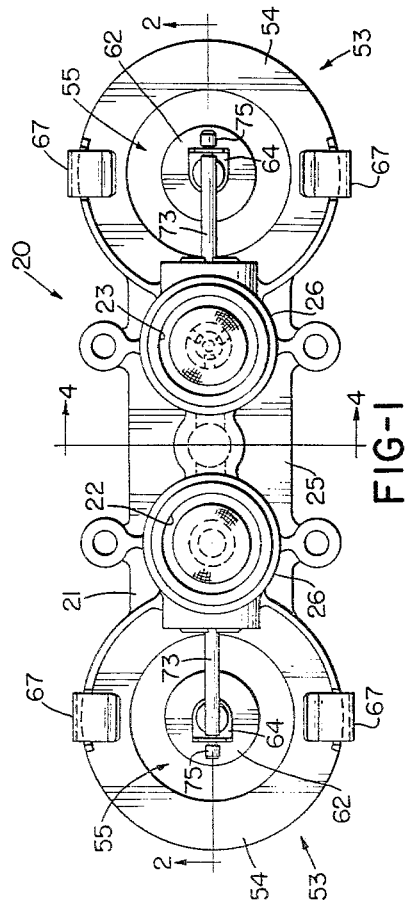
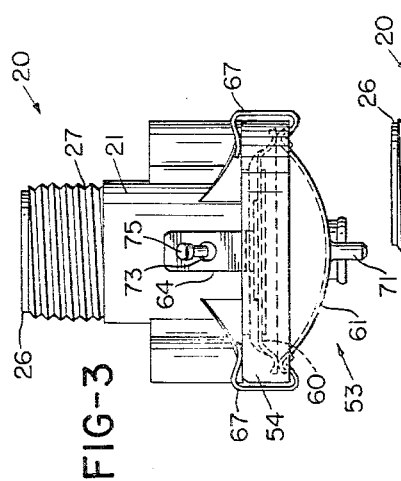
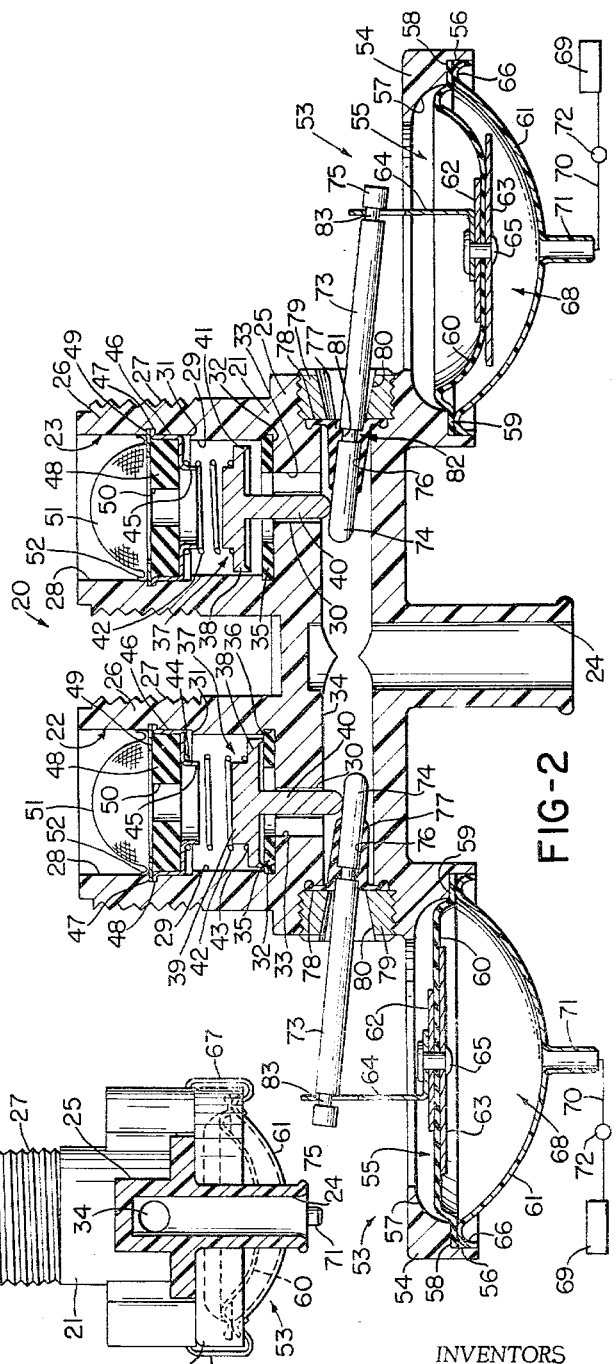

*Robert R Causor*

THEIR ATTORNEY

May 10, 1966   R. A. PALMER ETAL   3,250,295
WATER MIXER VALVE AND PARTS THEREFOR OR THE LIKE
Filed June 12, 1962                      3 Sheets-Sheet 3
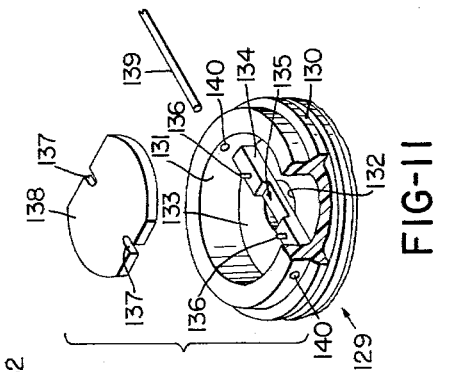
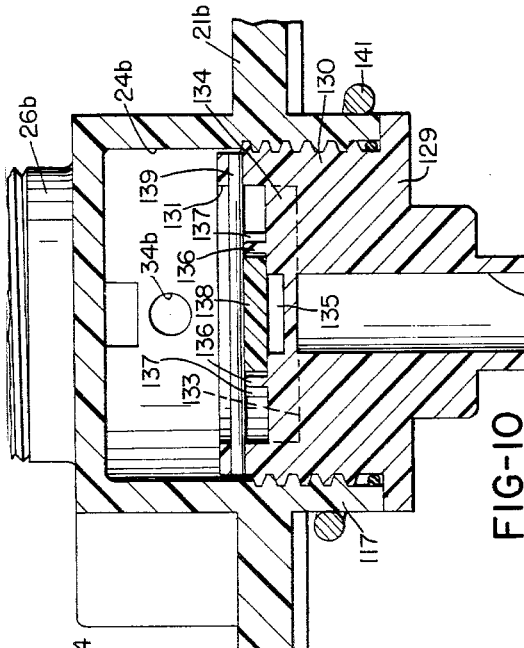
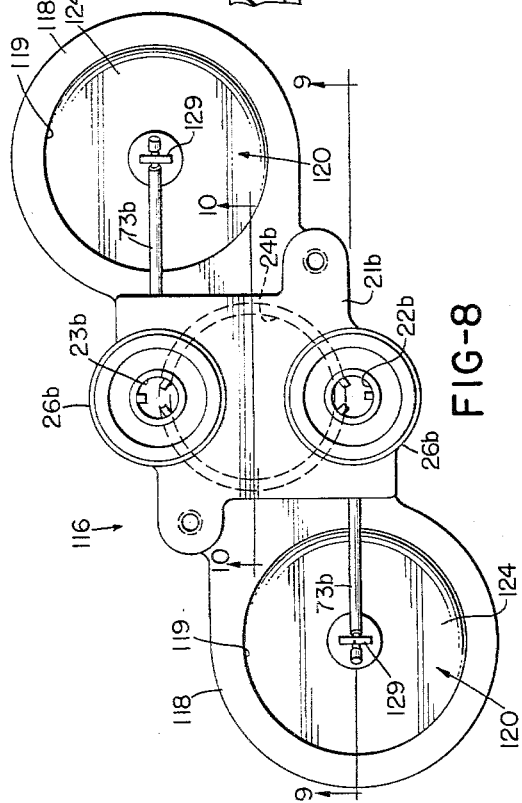
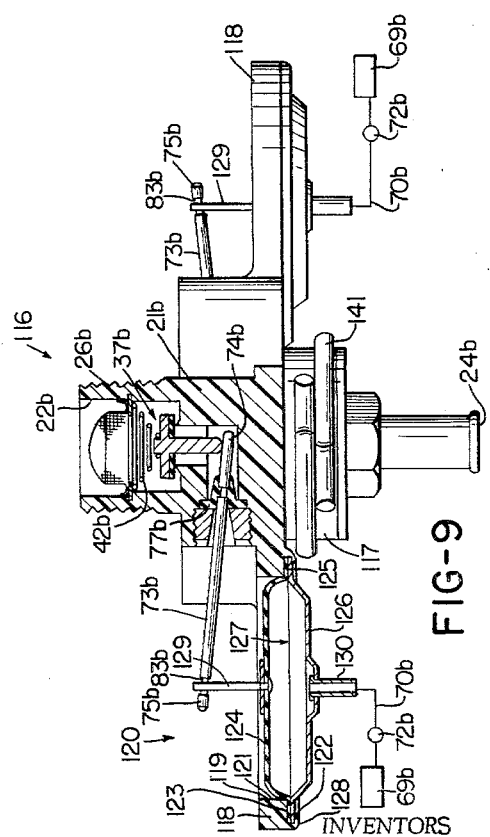
INVENTORS
REED A. PALMER
DONALD C. PRIDHAM, JR.
BY ROLAND D. BECK
Robert R Candor
THEIR ATTORNEY United States Patent Office 3,250,295
Patented May 10, 1966

3,250,295
WATER MIXER VALVE AND PARTS THEREFOR
OR THE LIKE
Reed A. Palmer, Los Alamitos, Donald C. Pridham, Jr., Orange, and Roland D. Beck, Anaheim, Calif., assignors to Robertshaw Controls Company, Richmond, Va., a corporation of Delaware
Filed June 12, 1962, Ser. No. 201,918
8 Claims. (Cl. 137—606)

This invention relates to an improved water mixer valve or the like and to improved parts for such a water mixer valve or the like.

It is well known that domestic washing machines and the like are each provided with a water mixing valve comprising a housing structure provided with a pair of inlets adapted to be respectively interconnected to a source of hot water and to a source of cold water, the inlets being interconnected to a common outlet leading to the washing machine or the like.

Valve means are respectively disposed in the inlets and are moved between the opened and closed positions thereof by actuating means whereby either hot water or cold water or various mixtures thereof may be supplied to the washing machine for the various cycles thereof depending upon the operation of the actuating means.

While the actuating means can comprise any suitable structure, this invention provides improved pneumatically operated actuating means to selectively control the valve means in the water mixer valve of this invention, the actuating means being controlled by a pressure differential arrangement, such as being provided by the pressure differential between a vacuum or suction source and the atmosphere as will be apparent hereinafter.

Further, this invention provides an improved one-piece housing for the water mixer valve or the like as well as improved mounting means for the improved actuating means of this invention.

Accordingly, it is an object of this invention to provide an improved water mixer valve or the like having one or more of the novel features of this invention set forth above or hereinafter shown or described.

Another object of this invention is to provide improved parts for such a water mixer valve or the like.

Other objects, uses and advantages of this invention are apparent from a reading of this description which proceeds with reference to the accompanying drawings forming a part thereof and wherein:

FIGURE 1 is a top view of an improved water mixer valve of this invention.

FIGURE 2 is an enlarged, cross-sectional view of the water mixer valve illustrated in FIGURE 1 and is taken on line 2—2 thereof.

FIGURE 3 is an end view of the water mixer valve illustrated in FIGURE 1.

FIGURE 4 is a cross-sectional view of the water mixer valve illustrated in FIGURE 1 and is taken along line 4—4 thereof.

FIGURE 8 is a top view of another water mixer valve of this invention.

FIGURE 9 is a cross-sectional view of the water mixer valve illustrated in FIGURE 8 and is taken on line 9—9 thereof.

FIGURE 10 is an enlarged, fragmentary, cross-sectional view of the water mixer valve illustrated in FIGURE 8 and is taken on line 10—10 thereof.

FIGURE 11 is a fragmentary, exploded, perspective view of the flow limiter means of the water mixer valve of FIGURE 8.

Figure 7:
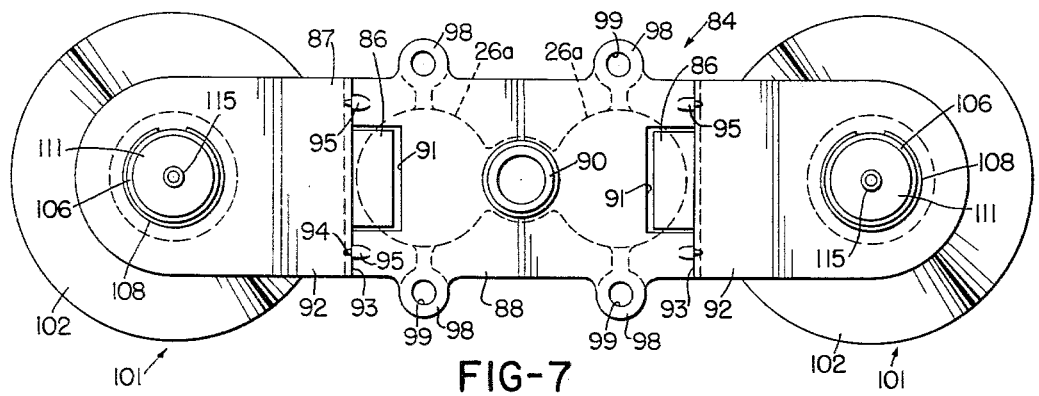
FIGURE 7 is a bottom view of the water mixer valve illustrated in FIGURE 5.

While the various features of this invention are hereinafter described and illustrated as being particularly adaptable for forming water mixer valves for domestic washing machines and the like, it is to be understood that the various features of this invention can be utilized singly or in any combination thereof to provide other constructions as desired.

Therefore, this invention is not to be limited to only the embodiments illustrated in the drawings, because the drawings are merely utilized to illustrate one of the wide variety of uses of this invention.

Referring now to FIGURES 1–4, an improved water mixer valve of this invention is generally indicated by the reference numeral 20 and comprises a one-piece housing 21 provided with a pair of inlet passage means 22 and 23 adapted to be respectively interconnected to sources of hot and cold water and to a common outlet passage means 24 adapted to be connected to the tub of a domestic washing machine or the like to fill the same with water at a selected temperature in a manner hereinafter described.

While the housing 21 can be formed in any suitable manner and of any suitable material, the embodiment of the housing 21 as illustrated in the drawings is formed from a thermoplastic material or the like suitably molded into the configuration illustrated in the drawings.

However, it is to be understood that the housing 21 can be formed of other material and can be suitably machined as desired.

The housing 21 includes a main body portion 25 provided with a pair of aligned and outwardly directed cylindrical portions 26 respectively externally threaded at 27 to be readily detachably secured to conduit means leading to the sources of hot and cold water.

The inlet passage means 22 and 23 respectively pass through the cylindrical projections 26 and each is defined by coaxially aligned and stepped bores 28, 29 and 30 respectively defining annular shoulders 31 and 32 therebetween, the annular shoulder 32 being interrupted by another bore or passage 33 that is interconnected with the bore 30 and leads from the annular shoulder 32 together with the bore 30 to a common manifold passage means 34 formed transversely through the body portion 25 of the housing 21 and medially joined to the outlet passage means 24.

A resilient, washer-like member 35 is disposed in each inlet passage means 22 and 23 and is pressed fitted into an annular recess 36 whereby each resilient member 35 is disposed flush against the annular shoulder 32 and forms a valve seat for a valve 37 now to be described.

Each valve means or member 37 comprises a disc-like head 38 having a cylindrical portion 39 projecting upwardly from one side thereof and a valve stem 40 projecting downwardly from the other side thereof and received in the guiding bore 30 formed in the housing 21.

A depending and sharp peripheral flange 41 of each valve member 37 is adapted to seat against its respective valve seat member 35 to prevent communication between its respective passage means 22 or 23 and the outlet passage means 24 for a purpose hereinafter described.

Each valve member 37 is normally urged to its closed position by a compression spring 42 having one end 43 thereof encompassing the cylindrical projection 39 and bearing against the disc-like portion 38, the other end 44 of the compression spring 42 encompassing a tubular portion 45 of a stepped tubular retainer 46 having an annular flange 47 received in an annular groove 48 formed in the respective cylindrical projection 26 of the housing 21.

A pair of flow limiters 48 are respectively disposed in the cup portions of the retainers 46 and are secured therein by split washer-like members 49 respectively received in the annular grooves 48.

In this manner, each flow limiter 48 controls the amount of fluid passing through a central aperture 50 thereof when its respective valve member 37 is moved to an opened position to permit a proper amount of water to be delivered to a domestic washing machine or the like in a desired time interval regardless of the pressure of the water at the source thereof, such flow limiters 48 being common in the art.

Dome-shaped screens or meshes 51 are disposed in each inlet passage means 22 and 23 on top of the split washers 49 thereof and are press fitted therein by having the reversely turned peripheral flanges 52 of the screens 51 snugly engaging the internal peripheral surfaces of the respective clyindrical portions 26 as illustrated.

In this manner, sediment and the like cannot pass from the source of the water to the valve means 37 to prevent proper operation thereof.

The valve means 37 of the water mixer valve 20 are operated in a manner hereinafter described by pneumatic actuating means 53 of this invention now to be described.

The housing 21 is provided with a pair of opposed and outwardly directed mounting portions 54 formed integrally with the housing 21 and disposed in cantilevered fashion relative thereto, each mounting means 54 having an opening 55 passing therethrough and respectively receiving the actuating means 53 of this invention.

In particular, each mounting portion 54 is provided with stepped portions 56 and 57 defining an annular shoulder 58 therebetween and adapted to receive the outer peripheral edge 59 of a flexible diaphragm 60 spanning the opening 55 and secured therein by a dome-shaped nonmovable wall 61 in a manner hereinafter described.

Each diaphragm 60 carries a pair of pressure plates 62 and 63 on opposed sides thereof as well as an L-shaped arm 64, the plates 62 and 63 and L-shaped arm 64 being secured to the respective diaphragm 60 by a rivet-like member 65.

Each dome-like member 61 has a reversely turned outer peripheral edge 66 adapted to be received in the stepped portion 56 of the respective mounting portion 54 to provide an arcuate surface engaging the peripheral edge 59 of the respective diaphragm 60 to compact the same in fluid tight relation against the annular shoulder 58 without providing an edge which would cut into the same, each dome-like member 61 being detachably secured in place to its respective mounting portion 54 by substantially U-shaped spring clips, FIGURES 3 and 4.

Therefore, it can be seen that the pneumatic actuating means 53 of this invention can be readily assembled to the one-piece housing 21 by the spring clips 67 without utilizing threaded fastening members as in the past to provide a chamber 68 between the movable wall 60 and the fixed wall 61 of each actuating means 53.

While each dome-like member 61 can be formed in any suitable manner and of any suitable material, the embodiment of the dome-like members 61 illustrated in the drawings is formed by suitably molding plastic material, such as polycarbonate, acetal resin, acrylonitrile butadiene styrene, polyvinyl chloride and cellulose acetate butyrate.

The chamber 68 of each actuating means 53 is adapted to be interconnected to a vacuum source 69 by a conduit means 70 leading to a tubular extension 71 projecting outwardly from each dome-shaped member 61, each conduit means 70 having a valve means 72 disposed therein to selectively interconnect the vacuum source 69 to its respective chamber 68.

A pair of actuating rods or levers 73 are respectively pivotally carried by the housing 21 intermediate the ends 74 and 75 of the rods 73, the ends 74 of the rods 73 being operatively interconnected to the stems 40 of the valve members 37 while the ends 75 thereof are operatively interconnected to the diaphragms 60 of the actuating means 53 by the L-shaped arms 64.

In particular, each rod 73 passes through a bore 76 formed in a tubular sealing member 77 having an outwardly directed annular flange 78 sandwiched between the housing 21 and a threaded nipple 79, the nipple 79 having a frusto conical bore 80 passing therethrough and receiving the rod 73 to permit the rod 73 to pivot relative to the housing 21 about the sealing member 77.

Each sealing member 77 has an inwardly directed annular flange 81 received in an annular groove 82 formed in respective actuating rod 73 whereby the actuating rod 73 is carried by the housing 21 and is pivotally movable relative thereto due to the flexure of sealing member 77.

The free end 74 of each rod 73 engages the stem 40 of the respective valve member 37 to move the valve member 37 to the open position when the end 75 of the rod 73 is pulled downwardly as illustrated in the right hand portion of FIGURE 2 to permit fluid to flow from the respective inlet passage means 22 and 23 to the outlet passage means 24.

Each rod 73 has a reduced portion 83 operatively interconnected to an L-shaped arm 64 whereby movement of the respective diaphragm 60 reflects movement of the rod 73 and, thus, movement of the respective valve member 37.

The operation of the water mixing valve 20 will now be described.

When the valve means 72 are disposed in positions to prevent the vacuum sources 69 from being interconnected to the chambers 68 of the actuating means 53 and to permit the atmosphere to be interconnected to the chambers 68, either the natural resiliency of the diaphragms 60 or the force of the compression springs 42, or both, moves the actuating rods 73 to the position illustrated in the left hand portion of FIGURE 2 to raise the diaphragms 60 and permit the valve members 37 to seat against the valve seats 35 under the force of the compression springs 42 and prevent communication between the inlet passage means 22 and 23 and the outlet passage means 24 whereby no water can flow to the domestic washing machine or the like.

Should it be desired to direct cold water to the washing machine, the valve means 72 of the right hand actuating means 53 is turned to a position to interconnect the vacuum source 69 to the vacuum chamber 68 of the right hand actuating means 53 whereby the vacuum in the chamber 68 causes the right hand diaphragm 60 to move downwardly to the position illustrated in the drawings and cause the lever 73 to pivot therewith and move the free end 74 thereof upwardly to carry the right hand valve member 37 upwardly in opposition to the force of the compression spring 42 to interconnect the source of cold water with the outlet passage means 24.

Similarly, should it be desired to merely interconnect the source of hot water to the outlet passage means 24, the left hand actuating means 53 is operated in the above manner to cause the left hand valve member 37 to open.

Of course, should it be desired to have a mixture of hot and cold water directed to the outlet passage means 24, both of the actuating means 53 are interconnected to the vacuum source 69 to open both of the valve members 37.

Depending upon the degree of vacuum imposed on the respective actuating means 53, the degree of mixture of hot and cold water can be controlled upon the difference in opening of the respective valve members 37 as is obvious.

Therefore, it can be seen that the water mixer valve 20 of this invention provides a structure wherein the housing thereof is formed from one piece and the valve means and actuating means thereof can be readily assembled to the housing without requiring threaded fastening members and in a non-time-consuming manner whereby the overall cost of the water mixing valve 20 of this invention is relatively low when compared with the costs of prior known mixing valves.

Further, the tolerances of the various parts of the water mixing valve 20 of this invention need not be as tightly controlled as is required when threaded fastening members are utilized whereby the overall cost of the water mixing valve of this invention is further reduced over the costs of prior known mixing valves.

Figure 6:
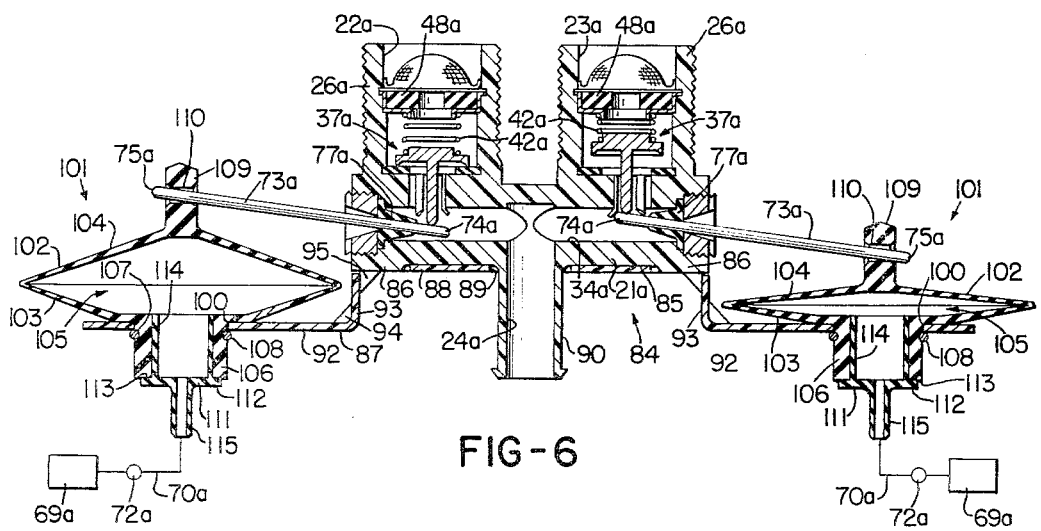
FIGURE 6 is a cross-sectional view of the water mixer valve illustrated in FIGURE 5 and is taken on line 6—6 thereof.
Figure 5:
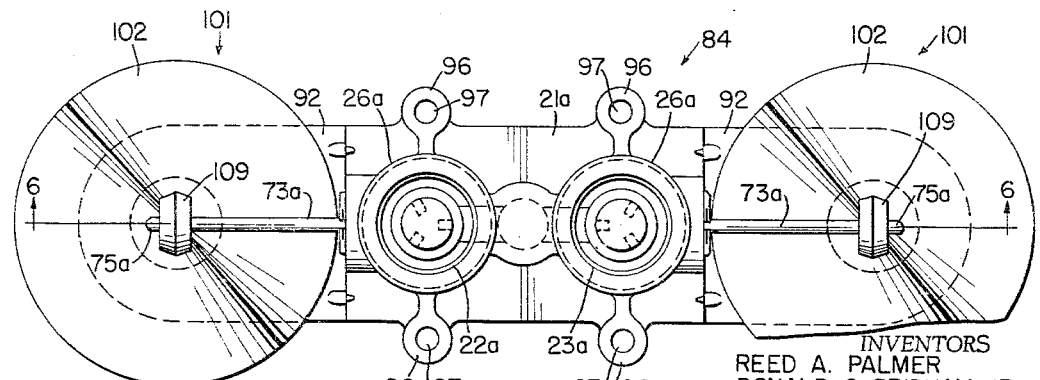
FIGURE 5 is a top view of another improved water mixer valve of this invention.

Another water mixer valve of this invention is generally indicated by the reference numeral 84 in FIGURES 5–7 and parts thereof similar to the water mixer valve 20 are designated by like reference numerals followed by the reference letter "a."

In particular, the water mixer valve 84 comprises a housing 21a provided with a pair of inlet passage means 22a and 23a respectively passing through cylindrical projections 26a and being adapted to the respectively interconnected to sources of hot and cold water, the inlet passage means 22a and 23a including valve means 37a and flow limiter means 48a formed in the manner previously described.

The inlet passage means 22a and 23a respectively lead to a transversely disposed manifold chamber or passage means 34a medially interconnected to an outlet passage 24a in the manner previously described.

While the housing 21a can be formed of any suitable material and in any suitable manner, the embodiment of the housing 21a illustrated in the drawings comprises thermoplastic material or the like suitably molded into the configuration illustrated in the drawings.

The housing 21a is provided with a lower surface 85 having a pair of outwardly directed and substantially rectangular projections 86 for a purpose hereinafter described.

A mounting plate or means 87 is formed separately from the housing 21a and is secured thereto in a manner later to be described, the mounting plate 87 comprising a flat medial portion 88 having a central aperture 89 formed therein and adapted to telescopically receive the tubular extension 90 of the housing 21a that carries the outlet passage means 24a.

The medial portion 88 of the mounting plate 87 is formed with a pair of rectangular openings 91, FIGURE 7, which respectively receive the projections 86 of the housing 21a when the mounting plate 87 is mounted thereto in the manner illustrated in FIGURE 6 to have the medial portion 88 disposed flush against the lower surface 85 of the housing 21a.

A pair of mounting portions 92 extend outwardly from plate 87 and are stepped downwardly from the medial portion 88 thereof by transversely disposed sections 93, the transversely disposed sections 93 being oppositely fluted at 94 and 95 to form reinforcing means between the transversely disposed sections 93 and the sections 88 and 92 thereof.

The housing 21a is provided with lugs or ears 96 having apertures 97 passing therethrough to secure the housing 21a to any supporting structure as well as to the mounting plate 87, the mounting plate 87 having outwardly directed lugs or ears 98 having apertures 99 passing therethrough and adapted to register with the apertures 97 in the housing 21a when the mounting plate 87 is positioned relative thereto in the manner illusrated in FIGURE 6 so that the mounting bolts passing through the registering apertures 97 and 99 not only secure the housing 21a to the supporting structure but also secure the mounting plate 87 to the housing 21a.

Each mounting portion 92 of the mounting plate 87 has an aperture or opening 100 passing therethrough and adapted to receive an actuating means 101 of this invention to respectively actuate the valve means 37a in a manner hereinafter described.

Each actuating means 101 comprises a bellows construction 102 having a pair of cup-shaped walls 103 and 104 integrally secured together at the outer peripheries thereof to define a chamber 105 therebetween.

The wall 103 of each bellows construction 102 has an outwardly extending tubular portion 106 formed integrally therewith and providing passage means leading from the exterior of the bellows construction 102 to the chamber 105 thereof for a purpose hereinafter described.

The tubular portion 106 of each bellows construction 102 is adapted to be snugly received in the opening 100 of a respective mounting portion 92 of the mounting plate 87 and has an annular recess 107 formed therein and spaced from the movable wall 103 whereby a split retaining ring 108 can be received in the recess 107 to secure the respective bellows construction 102 to the mounting portion 92 of the mounting plate 87 in the manner illustrated in FIGURE 6.

The other movable wall 104 of each bellows construction 102 is provided with an outwardly extending projection 109 formed integrally therewith and having an aperture 110 passing therethrough to receive an end 75a of an actuating rod 73a pivotally mounted to the housing 21a by a flexible sealing device 77a in the manner previously described, the free end 74a of each actuating rod 73a being operatively interconnected to the valve means 37a to actuate the valve means 37a in a manner later to be described.

While each bellows construction 102 can be formed of any suitable material and in any suitable manner, the embodiment of the bellows constructions 102 illustrated in the drawings is formed by a simple molding operating of a polypropylene plastic or the like.

In this manner, the bellows constructions 102 can be formed in a relatively simple manner and comprise an integral structure which can be readily secured to the mounting plates 87 by a simple snap ring operation to facilitate rapid assembly of the water mixer valves 84 of this invention.

A pair of nipples 111 are respectively carried by the bellows constructions 102 and each comprises a circular disc portion 112 adapted to seat on the free end 113 of the tubular portion 106 of the respective bellows construction 102, each disc portion 112 of each nipple 111 having a tubular portion 114 extending from one side thereof and adapted to be snugly received in the tubular portion 106 of the respective bellows construction 102.

If desired, the spilt retaining rings 108 can be so constructed and arranged that the rings 108 readily inwardly deform the tubular portions 106 of the bellows constructions 102 to further secure the nipples 111 in place.

A tubular portion 115 extends from the other side of each disc portion 112 of each nipple 111 and is adapted to be interconnected to a conduit 70a leading to a vacuum source 69a, the conduit 70a having a valve means 72a disposed therein adapted to selectively interconnect either the atmosphere to the chamber 105 of the respective bellows construction 102 or the vacuum source 69a thereto as will be apparent hereinafter.

Therefore, it can be seen that the water mixing valve 84 of this invention can be formed of a one-piece housing without utilizing threaded fastening means and includes novel actuating means 101 formed in a relatively simple and effective manner to control the valve means 37a in a manner now to be described.

In particular, when the valve means 72a are interconnecting the atmosphere to the chambers 105 of the bellows constructions 102, either the natural resiliency of the bellows constructions 102 or the force of the compression springs 42a, or both, causes the bellows constructions 102 to assume the position illustrated by the left hand bellows construction 102 in FIGURE 6 whereby the respective valve members 37a are moved to their closed positions by the force of the compression springs 42a to prevent water from flowing from the inlet passage means 22a and 23a to the outlet passage means 24a leading to a washing machine or the like.

However, where it is desired to interconnect either the hot or cold water, or both, to the outlet passage means 24a, the respective valve means 72a is selectively moved to a position to interconnect the vacuum source 69a to the desired bellows construction 102 whereby the vacuum source 69a collapses the bellows construction 102 in a manner illustrated in the right hand portion of FIGURE 6 to cause the respective actuating rod 73a to raise the valve member 37a in opposition to the force of the compression spring 42a and permit water to flow through the respective passage means 22a or 23a to the outlet passage means 24a in the manner previously described for the reasons previously described.

Thereafter, when it is desired to terminate the flow of water to the outlet passage means 24a, the actuated bellows construction or constructions 102 are returned to the normal position illustrated in the left hand portion of FIGURE 6 by having the valve means 72a interconnect the atmosphere to the chambers 105 of the bellows constructions 102 whereby the bellows constructions 102 in combination with the spring means 42a return the actuating rods 73a to a position to permit the valve means 37a to close and terminate the flow of water to the outlet passage means 24a.

Accordingly, it can be seen that another water mixer valve 84 of this invention is provided by this invention which operates in substantially the same manner as the water mixer valve 20 previously described except that the actuating means 101 thereof comprise bellows constructions rather than flexible diaphragms.

Further, the mounting means of the actuating means 101 of the valve means 84 comprises a separate part assembled to the housing 21a. However, it is to be understood that the mounting means for the actuating means 101 of the water mixer valve 84 can be formed integrally with the housing 21a in substantially the same manner that the mounting means of the actuating means 53 of the water mixer valve 20 is formed integral with the housing 21.

Another water mixing valve of this invention is generally indicated by the reference numeral 116 in FIGURES 8–11 and parts thereof similar to the water mixer valve 20 are indicated by like reference numerals followed by the reference letter "b."

The water mixer valve 116 of this invention comprises a one-piece housing 21b having inlet passage means 22b and 23b respectively formed through cylindrical projections 26b of the housing 21b and respectively carrying valve means 37b to control the flow of water therethrough in the manner previously described.

While the housing 21b can be formed in any suitable manner and of any suitable material, the embodiment thereof illustrated in the drawings is formed by suitably molding thermoplastic material or the like.

The inlet passage means 22b and 23b are respectively interconnected to a transversely disposed manifold passage means 34b interconnected to an outlet passage means 24b formed in a tubular extension 117.

The housing 21b includes a pair of cantilevered, integral mounting portions 118 respectively provided with openings 119 passing therethrough and carrying actuating means 120 later to be described.

The mounting portions 118 are disposed out of line with the inlet passage means 22b and 23b whereas the inlet passage means and mounting means of the water mixer valves 20 and 84 previously described are disposed in aligned relation.

The opening 119 in each mounting means 118 includes a pair of coaxially disposed and stepped bores 121 and 122 defining an annular shoulder 123 therebetween.

A flexible diaphragm 124 is disposed in each opening 119 and has an outer peripheral flange 125 disposed against the annular shoulder 123 and held thereto by a fixed cup-shaped wall 126 cooperating with the diaphragm 124 to define a chamber 127 therebetween.

Each diaphragm 124 and fixed wall 126 are secured in stacked relation against the annular shoulder 123 of the respective mounted portion 118 by cold heading the annular flange 128 of the mounting portion 118 against the fixed wall 126 in the manner illustrated in FIGURE 9 whereby the actuating means 120 can be secured to the housing 21b without utilizing threaded fastening members as in the past.

The flexible diaphragm 124 of each actuating means 120 includes an upwardly extending arm 129 operatively interconnected to the reduced portion 83b of an end 75b of an actuating rod 73b pivotally mounted to the housing 21b by the flexible seal member 77b in the manner previously described whereby the free end 74b of the actuating rod 73b is operatively interconnected to a respective valve means 37b.

The fixed wall 126 of each actuating means 120 carries a tubular extension 130 adapted to be interconnected to a conduit means 70b leading to a vacuum source 69b, the conduit 70b having valve means 72b disposed therein to selectively interconnect the chamber 127 of the respective actuating means 120 to the atmosphere or to the vacuum source 69b in the manner previously described.

The operation of the water mixer valve 116 will now be described.

When the valve means 72b are respectively interconnecting the atmosphere to the chambers 127 of the acuating means 120, either the natural resiliency of the diaphragm 124 or the force of the compression springs 42b, or both, move the diaphragms 124 upwardly to the position illustrated in FIGURE 9 whereby the actuating rods 73b permit the valve means 37b to be disposed in a closed position under the force of the compression springs 42b to prevent the flow of water through the water mixing valve 116.

When it is desired to permit water to flow through one of the inlet passage means 22b an 23b, the respective valve means 72b interconnects the vacuum source 69b to the chamber 120 of the respective actuating means 120 to pull the diaphragm 124 downwardly to permit the actuating rod 73b to lift the valve means 37b from its seated position in opposition to the force of the compression spring 42b to permit water to flow through the water mixing valve.

Therefore, it can be seen that the water mixing valve 116 of this invention also provides a one-piece housing assembly which is adapted to receive the various parts therein without utilizing threaded fastening members so that the overall assembly of the water mixing valve 116 can be formed in a relatively simple and rapid manner and without time-consuming assembling procedures.

Further, the actuating means 120 of this invention can be assembled to the housing 21b in a relatively simple and non-time-consuming manner to produce an effective actuating means for the valve means 37b thereof.

As illustrated in FIGURES 10 and 11, a flow limiter means 129 is adapted to be disposed in the outward passage means 24b of the water mixer valve 116 by having a tubular portion 130 thereof threadedly disposed in the tubular extension 117 of the housing 21b as illustrated in FIGURE 10.

The flow limiter means 129 has a pair of coaxial and stepped bores 131 and 132 formed therein and defining an annular shoulder 133 therebetween, the stepped bores 131 and 132 interconnecting the outlet passage means 24b with a suitable conduit leading to the washing machine or the like.

A substantially rectangular projection 134 extends upwardly from the annular shoulder 133 and spans the bore 132 in the manner illustrated in FIGURE 11, the projection 134 being recessed at 135 to provide restriction means in a manner hereinafter described.

A pair of pin means 136 extend upwardly from the projection 134 and are adapted to be respectively received in slots 137 of the flow controlling flexible valve member 138 in the manner illustrated in FIGURE 10, the valve member 138 being held on the projection 134 by a pin 139 passing through aligned apertures 140 in the tubular portion 130 of the flow limiting means 129.

As the flow of water to the outlet means 24b increases, the valve member 138 flexes downwardly to progressively restrict the amount of opening leading to the bore 132 so that the amount of water passing through the bore 132 to the washing machine or the like is maintained at a substantially constant amount per second regardless of the pressure of the water in advance of the flexible valve member 138 whereby the flow limiter means 129 permits the washing machine to be filled with the desired amount of water in a desired time interval regardless of the various water pressures encountered in different regions.

While the particular details of the flow limiter means 129 of the water mixer valve 116 do not form any part of this invention, further details as to the structure and operation thereof can be obtained by reference to the copending United States patent application of Jean Bordeaux et al., Serial No. 152,541, filed November 16, 1961.

To insure a proper seal between the tubular extension 117 of the housing 21b and the flow limiter means 129, a flexible rod 141 can be coiled about the extension 117 to inwardly deform the same into sealing engagement with the flow limiter means 129.

Accordingly, it can be seen that this invention provides improved water mixer valves or the like formed from one-piece housings that are adapted to readily receive operating parts in a simple and non-time-consuming manner whereby the overall cost of the respective water mixer valve is relatively low in relation to the costs of former water mixer valves.

Further, this invention provides improved parts for such water mixer valves or the like.

While the form of the invention now preferred has been disclosed as required by the statutes, other forms may be used, all coming within the scope of the claims which follow.

What is claimed is:

1. A water mixer valve or the like comprising a housing, said housing having a plurality of inlet passage means provided therein and having an outlet passage means provided therein and interconnected to said inlet passage means, valve means carried by said housing and respectively controlling the flow through said inlet passage means, mounting means carried by said housing and respectively having openings passing therethrough, and actuating means respectively carried in said openings of said mounting means and being respectively and operatively interconnected to said valve means to selectively open and close said valve means, each actuating means including a bellows construction having opposed end walls, one of said walls of each bellows construction having a tubular portion passing through a respective opening and interconnecting the exterior of said bellows construction with the interior thereof, said tubular portion of each bellows construction carrying fastening means to sandwich said mounting means between said one wall and said fastening means of each bellows construction.

2. A water mixer valve or the like as set forth in claim 1 wherein each tubular portion of each bellows construction has an annular recess and said fastening means thereof comprises a split ring disposed in said recess.

3. A water mixer valve or the like as set forth in claim 1 wherein the other wall of each bellows construction carries a projection having an aperture therein and receiving one end of an actuating rod operatively interconnected to a respective valve means.

4. A water mixer valve or the like as set forth in claim 1 wherein a plurality of nipple-like members are respectively disposed in said tubular portions of said bellows constructions.

5. A water mixer valve or the like as set forth in claim 1 wherein said walls of each bellows construction are movable walls.

6. A water mixer valve or the like comprising a housing, said housing having a plurality of inlet passage means provided therein and having an outlet passage means provided therein and interconnected to said inlet passage means, valve means carried by said housing and respectively controlling the flow through said inlet passage means, mounting means carried by said housing and respectively having openings passing therethrough, and actuating means respectively carried in said openings of said mounting means and being respectively and operatively interconnected to said valve means to selectively open and close said valve means, each actuating means including a diaphragm and a fixed wall cooperating together to define a chamber therebetween, each said fixed wall holding its respective diaphragm against said mounting means and said mounting means holding each fixed wall by a turned over portion of said mounting means.

7. A water mixer valve or the like comprising a housing, said housing having a plurality of inlet passage means provided therein and having an outlet passage means provided therein and interconnected to said inlet passage means, valve means carried by said housing and respectively controlling the flow through said inlet passage means, mounting means carried by said housing and respectively having openings passing therethrough, and actuating means respectively carried in said openings of said mounting means and being respectively and operatively interconnected to said valve means to selectively open and close said valve means, each actuating means including a diaphragm and a fixed wall cooperating together mounting means and being respectively and operatively to define a chamber therebetween, each said fixed wall holding its respective diaphragm against said mounting means, each said actuating means including spring clip means holding said fixed wall to said mounting means.

8. A water mixer valve or the like comprising a housing, said housing having a plurality of inlet passage means provided therein and having an outlet passage means provided therein and interconnected to said inlet passage means, valve means carried by said housing and respectively controlling the flow through said inlet passage means, said valve means opening in a direction opposite the flow therethrough, vacuum operated bellows constructions carried by said housing and being respectively and operatively interconnected to said valve means to selectively open and close said valve means upon selected pressure differentials between the interiors and exteriors of said bellows constructions, said vacuum operated bellows constructions opening said valve means when said bellows constructions are evacuated, each bellows construction having opposed end walls, one of said walls being interconnected to said housing and having passage means leading to the interior of the respective bellows construction, the other of said walls being operatively interconnected to its respective valve means, said other wall of each bellows construction having an outwardly extending projection provided with an aperture passing therethrough, and a plurality of actuating rods pivotally mounted to said housing and having opposed ends, each rod having one end operatively interconnected to a valve means and the other end thereof passing through said aperture in one of said bellows constructions.

References Cited by the Examiner

UNITED STATES PATENTS 1,236,216   8/1917   Schuler _____ 251—61
2,359,676  10/1944   Raney _____ 137—784

(Other references on following page)

UNITED STATES PATENTS

| | | | |
|---|---|---|---|
| 2,506,694 | 5/1950 | Watson | 251—61.1 X |
| 2,565,472 | 8/1951 | Castel | 92—92 |
| 2,684,829 | 7/1954 | McFarland | 251—331 |
| 2,708,092 | 5/1955 | Smith | 137—606 X |
| 2,712,324 | 7/1955 | Lund | 137—606 |
| 2,732,859 | 1/1956 | Chace | 137—607 |
| 2,770,441 | 11/1956 | Grove | 251—61 X |
| 2,918,250 | 12/1959 | Hosking | 251—61 X |
| 2,992,658 | 7/1961 | Bowerman | 137—784 |
| 3,045,696 | 7/1962 | Cobb | 137—607 |
| 3,077,186 | 2/1963 | De Beaubien | 92—62 |

ISADOR WEIL, *Primary Examiner.*

WILLIAM F. O'DEA, *Examiner.*

D. ZOBKIW, *Assistant Examiner.*